US008755975B2

(12) United States Patent
Oakley

(10) Patent No.: US 8,755,975 B2
(45) Date of Patent: Jun. 17, 2014

(54) AUTOMATIC VEHICLE DOOR MOVEMENT CONTROL SYSTEM

(75) Inventor: Michael Oakley, Jerome Township, OH (US)

(73) Assignee: Honda Motor Co., Ltd., Tokyo (JP)

( * ) Notice: Subject to any disclaimer, the term of this patent is extended or adjusted under 35 U.S.C. 154(b) by 665 days.

(21) Appl. No.: 12/985,720

(22) Filed: Jan. 6, 2011

(65) Prior Publication Data

US 2012/0179336 A1 Jul. 12, 2012

(51) Int. Cl.
*G06F 19/00* (2011.01)
*E05F 15/20* (2006.01)

(52) U.S. Cl.
CPC ............ *E05F 15/20* (2013.01); *E05F 15/2092* (2013.01); *E05Y 2900/531* (2013.01); *E05Y 2900/546* (2013.01)
USPC .............. 701/49; 318/282; 318/283; 318/466

(58) Field of Classification Search
CPC ................ E05F 15/20; E05F 15/2092; E05Y 2900/351; E05Y 2900/546
USPC ............................ 701/49; 318/282, 283, 466
See application file for complete search history.

(56) References Cited

U.S. PATENT DOCUMENTS 5,723,960 A * 3/1998 Harada ........................ 318/469
6,075,460 A 6/2000 Minissale et al.
6,081,088 A * 6/2000 Ishihara et al. ............... 318/466
6,225,768 B1 * 5/2001 Cookson et al. .............. 318/280
6,943,515 B2 9/2005 Kidokoro
6,946,811 B2 * 9/2005 Kikuta et al. ................. 318/468
7,183,733 B2 2/2007 Suzuki et al.
7,210,731 B2 * 5/2007 Ichinose et al. ............... 296/155
7,218,069 B2 5/2007 Imai et al.
7,472,944 B2 * 1/2009 Miyagawa et al. ........... 296/155
7,812,554 B2 * 10/2010 Takahashi ..................... 318/282
8,002,328 B2 * 8/2011 McKee et al. .............. 296/146.4
8,007,027 B2 * 8/2011 Watanabe et al. .......... 296/146.4
8,098,037 B2 * 1/2012 Sugiura ......................... 318/451
8,103,416 B2 * 1/2012 Frommer et al. ............... 701/49
8,456,121 B2 * 6/2013 Yuasa et al. ................... 318/469
8,567,129 B2 * 10/2013 Suzuki et al. ................... 49/506

(Continued)

FOREIGN PATENT DOCUMENTS

DE 3432653 C1 * 1/1986
JP 08204681 A * 8/1996

*Primary Examiner* — Tuan C. To
(74) *Attorney, Agent, or Firm* — Rankin, Hill & Clark LLP

(57) ABSTRACT

A controller and control method for an automatic vehicle door movement control system which includes a plurality of signaling devices and at least one door actuator for opening and closing at least one vehicle door in accordance with an instruction signal from the signaling devices is configured to selectively mask a redundant instruction signal. The redundant instruction signal is an instruction signal received after the receipt of a primary instruction signal and prior to the completion of an automatic door movement operation. The redundant instruction signal is masked when it is determined to be against an ascertained user intent or when the primary instruction signal is determined to be more indicative of the ascertained user intent.

13 Claims, 7 Drawing Sheets

(56) References Cited

U.S. PATENT DOCUMENTS

| | | | | |
|---|---|---|---|---|
| 2002/0183008 | A1 | 12/2002 | Menard et al. | |
| 2005/0280387 | A1* | 12/2005 | Nagashima et al. | 318/466 |
| 2006/0164029 | A1* | 7/2006 | Suzuki et al. | 318/283 |
| 2006/0290309 | A1* | 12/2006 | Saitou et al. | 318/469 |
| 2008/0054649 | A1* | 3/2008 | Ueda et al. | 292/216 |
| 2008/0110092 | A1* | 5/2008 | Takahashi | 49/28 |
| 2008/0147270 | A1* | 6/2008 | Sakane et al. | 701/36 |
| 2009/0173006 | A1* | 7/2009 | Jitsuishi et al. | 49/31 |
| 2009/0198420 | A1* | 8/2009 | Newman et al. | 701/49 |
| 2011/0061975 | A1* | 3/2011 | Nakashima | 187/247 |

* cited by examiner

T1 = Switch Recognition Time [ms]
T = Input mask time [ms]
TC = Time Required for Completion of Door Movement Operation

AUTOMATIC VEHICLE DOOR MOVEMENT CONTROL SYSTEM

BACKGROUND

The present disclosure generally relates to an automatic vehicle door movement control system, and more particularly relates to an automatic vehicle door movement control system which selectively utilizes an input mask.

Vehicles having large passenger and cargo spaces, such as sports utility vehicles and vans, may selectively enclose and provide access to passenger and cargo spaces using large doors. For example, sports utility vehicles and vans may employ a rear tailgate door hingedly attached to a vehicle body adjacent to a rear tailgate opening to selectively allow access to a rear cargo area. Vans may also employ one or more sliding side doors for selectively opening and closing an ingress/egress passage defined in one or both sides of the van to selectively allow access to the passenger area. As the openings enclosed by the tailgate and sliding side door(s) may be larger than those enclosed by conventional swinging vehicle doors, these doors may be larger than their counterpart swinging doors, and as such may also be heavier and more cumbersome to operate. This may especially be so for smaller and/or weaker users.

To facilitate operation, the associated vehicle may be provided with a system for automatically opening and closing the large vehicle doors (as well as smaller swinging vehicle doors). Such a system may be an electronically actuated system which automatically opens and closes the vehicle doors upon receipt of an instructing signal. In operation, these systems may receive an instructing signal, such as an open signal or a close signal, and operate to move the door in accordance with the instructing signal.

Though an improvement over conventional, manually operated large vehicle doors, the automatic door opening/closing systems may present new problems associated with the operation thereof. One such problem that may be encountered occurs when more than one instructing signal is simultaneously or near-simultaneously received by the control system. When more than one instructing signal is received in short-order, the system may become overloaded, and accordingly may not control movement of the large vehicle door(s) in accordance with the user's intended instructions.

SUMMARY

According to one aspect, a control system for controlling an automatic vehicle door movement control system comprises a plurality of signaling devices, a controller, and at least one door actuator. The plurality of signaling devices are each adapted to generate an instruction signal and the controller is provided to receive the instruction signal generated by the plurality of signaling devices. The at least one door actuator is provided to open and close at least one vehicle door in accordance with the instruction signal from the signaling devices, and the controller is configured to selectively mask a redundant instruction signal received within a predetermined mask time of a primary instruction signal. According to another aspect, an automatic vehicle door movement control system for automatically controlling movement of a vehicle door comprises a controller and a plurality of signaling devices configured to output a door movement instruction signal. The controller further comprises a receiver configured to receive door movement instruction signals from each of the plurality of signaling devices, and an input mask configured to selectively mask a redundant door movement instruction signal for a mask time.

According to still another aspect, a method for controlling automatic vehicle door movement is described. The method comprises receiving a primary door movement instruction signal and beginning an automatic vehicle door movement operation in accordance with the primary door movement instruction signal. A redundant door movement instruction signal is selectively masked so as to allow the automatic vehicle door movement operation to continue.

According to yet another aspect, a method for selectively masking a redundant door movement instruction signal when a primary door movement instruction signal and the redundant door movement instruction signal are received by an automatic door movement controlling system is described. The method comprises masking the redundant door movement instruction when a direction instruction associated with the primary door movement instruction signal is the same as a direction instruction associated with the redundant door movement instruction signal, the primary door movement instruction signal and redundant door movement instruction signal originate from different signaling devices, a time lapse between receipt of the primary door movement instruction signal and receipt of the redundant door movement instruction signal is less than a predetermined time, and a time required for completion of the automatic door movement operation is greater than the mask time.

DETAILED DESCRIPTION

Figure 1A:
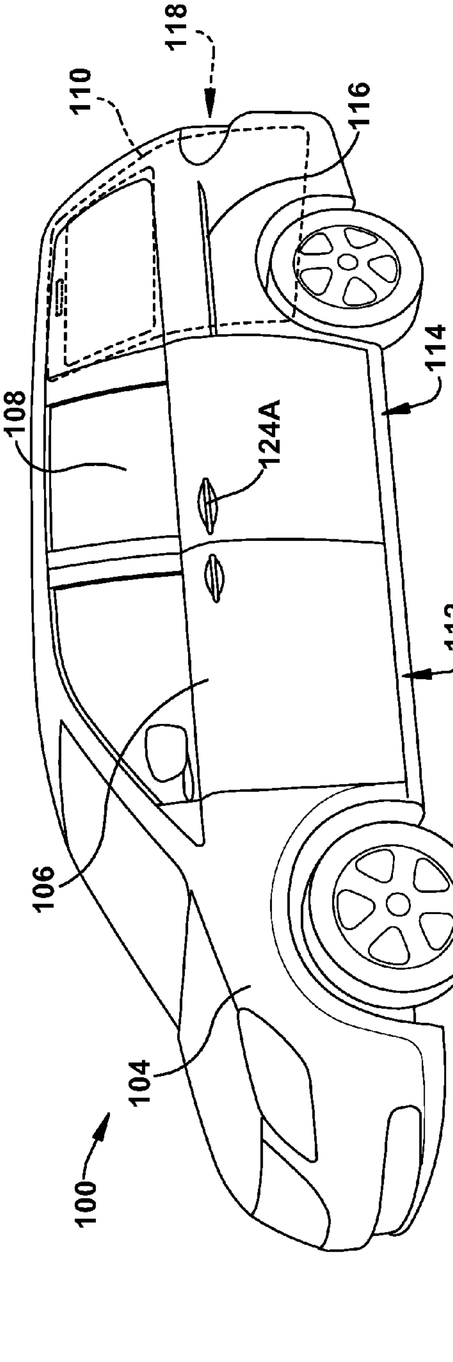
FIG. 1A is a perspective view illustrating an exemplary vehicle for use with an automatic door movement control system having a sliding side door and rear tailgate in a closed position.

The description and drawings herein are merely illustrative and various modifications and changes can be made in the structures disclosed without departing from what is defined in the appended claims. All references to direction and position, unless otherwise indicated, refer to a vehicle orientation and/or the orientation of the structures and components illustrated in the drawings and should not be construed as limiting the claims appended hereto. Like numbers refer to like parts throughout the several views.

Figure 1B:
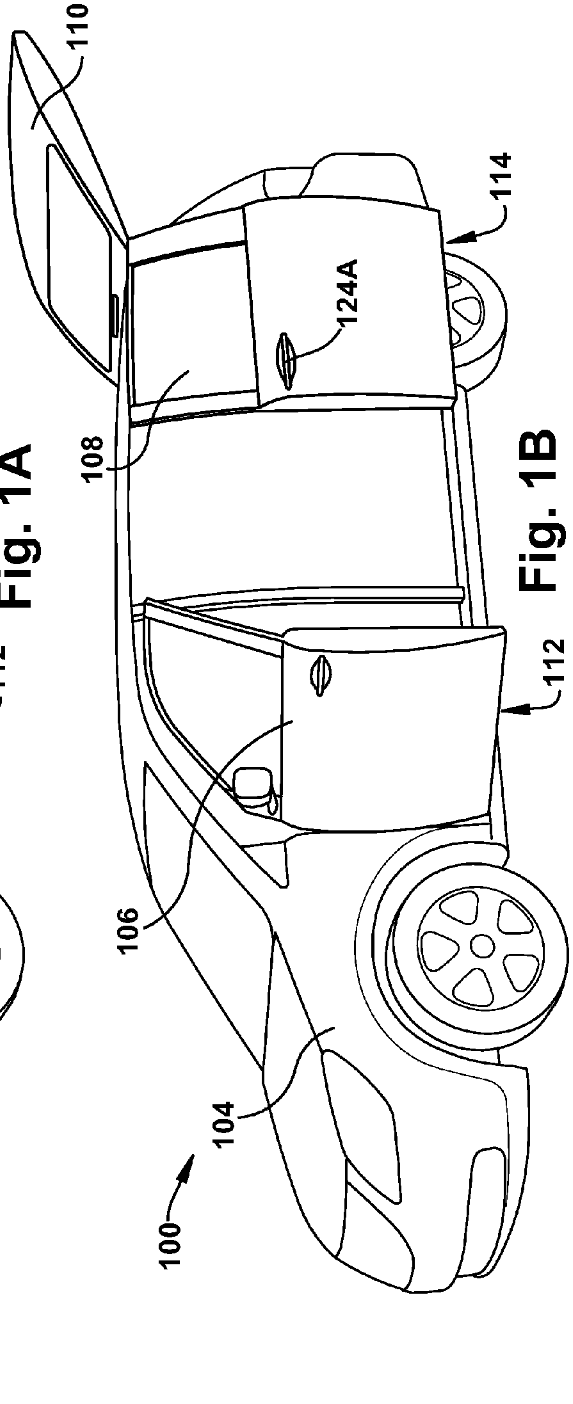
FIG. 1B is a perspective view illustrating the exemplary vehicle for use with the automatic door movement control system having the sliding side door and rear tailgate in an opened position.

FIGS. 1A and 1B illustrate an exemplary vehicle 100 for use with an automatic vehicle door movement control system 102 (hereinafter, "control system 102"). As illustrated, the vehicle 100 can be a van or minivan having a vehicle body 104, a pair of front swinging doors 106, at least one side sliding door 108, and a rear tailgate 110. The control system 102 is similarly amenable for use with other types of vehicles, such as sedans, coupes, hatchbacks, station wagons, buses, trucks, etc. The illustrated minivan-style vehicle 100 is used as the exemplary vehicle due to the use of front swinging doors 106, side sliding door(s) 108, and the rear tailgate 110, which are popular varieties of vehicle doors. The configuration of the vehicle body 104 and doors 106, 108, 110 is generally known, and will therefore not be described in particular detail herein.

The vehicle body 104 includes two front door openings 112 defined in sides of a front of the vehicle body 104 adjacent to a driver seat and a front passenger seat (only the opening 112 adjacent the driver seat is shown). The front swinging doors 106 are hingedly attached at front ends thereof to the vehicle body 104. The front swinging doors 106 are provided with a latch mechanism (not shown) configured to selectively engage a corresponding latch mechanism (not shown) disposed on the vehicle body 104 adjacent to the front door openings 112 so that the front swinging doors 106 can be held closed and released for opening.

The front swinging doors 112 are movable between a closed position, where the front door openings 112 are enclosed by the front swinging doors 112 (shown in FIG. 1A), and an opened position, where the front swinging doors 106 rotate in a forward direction of the vehicle 100 about their hinged attachment point to expose an interior of the vehicle body 104 through the front door openings 112 so as to allow for ingress and egress. Further, the hinged attachment of the front swinging doors 106 to the vehicle body 104 may include some variety of detent or other mechanism to hold the front swinging doors 106 in one or more predetermined positions.

The vehicle body 104 also includes driver and passenger side sliding door openings 114 (hereinafter, "side openings 114") disposed behind the front door openings 112 in a side of the vehicle body 104 (only a driver side opening 114 is shown). The side openings 114 may be larger than the front door openings 112 and are generally sized to allow access to a rear and/or intermediate passenger portion of the vehicle. The side sliding doors 108 are movable between a closed position where the side openings 114 are enclosed (shown in FIG. 1A), and an opened position where the side sliding doors 108 slide in a rearward direction of the vehicle 100 so as to expose the rear passenger portion of the vehicle 100 through the side openings 114 (shown in FIG. 1B) to allow for passenger ingress and egress.

The side sliding doors 108 have a latch mechanism (not shown) configured to selectively engage a corresponding latch mechanism (not shown) provided on the vehicle body 104 adjacent to the side openings 114 so that the side sliding doors 108 can be held closed and released for opening. Further, the sliding side doors 108 are provided with a slide mechanism (not shown) which fits within a guide channel 116 defined in the vehicle body 104. The side sliding doors 108 are movable in a forward and rearward vehicle direction along the guide channel 116 through the interaction with the slide mechanism. Further, the side sliding doors 108, the slide mechanism, and/or the guide channel 116 may be equipped with one or more detent or other mechanisms to facilitate holding the side sliding door 108 in one or more predetermined positions.

A rear or tailgate opening 118 is defined through a rear end of the vehicle body 104. The tailgate opening 118 may be larger than the front door openings 112 and is selectively enclosed by the rear tailgate 110. The illustrated rear tailgate 110 is hingedly attached to the vehicle body 104 at a position adjacent to the tailgate opening 118 so as to be swingable about the hinged attachment between a closed position (shown in FIG. 1A) and an opened position (shown in FIG. 1B). The rear tailgate 110 has a latch mechanism (not shown) configured to engage a corresponding latch mechanism (not shown) provided on the vehicle body 104 adjacent to the tailgate opening 108 so that the rear tailgate 110 can be held closed and released for opening.

Each of the vehicle doors 106, 108, 110 is provided with an outer handle and an inner handle configured to allow a user to manually open and close the doors 106, 108, 110. The inner and outer handles may be mechanically connected to one or both of the latch mechanisms to allow for release thereof upon actuation. The structure and mechanical operation of the handles and latch mechanisms is generally known in the art, and will therefore not be described in detail herein. Additionally, the outer and inner handles may be connected to the control system 102 so as to trigger operation of the control system 102 upon actuation. Triggering of the control system 102 using the outer and inner handles is described in further detail below.

The control system 102 is operable to automatically open and close each of the above-described vehicle doors 106, 108, 110. The control system 102 is also amenable for use with any other variety of vehicle door, including, but not limited to, a laterally swinging tailgate, an upward sliding door (such as is used at a rear end of trucks to enclose a trailer cargo space), and/or other varieties of doors. To simplify description of the control system 102, the instant disclosure is made with respect to one side sliding door 108 of the illustrated vehicle 100. It is to be appreciated that operation of the control system 102 may be similar, if not identical, for the front swinging doors 106, the other side sliding door 108, the rear tailgate 110, and any other variety of vehicle door. It is also to be appreciated that the control system 102 is amenable to operate each of the vehicle doors 106, 108, 110 separately or simultaneously. Any reference hereinbelow to a "vehicle door" refers to a particular vehicle door associated with operation of the control system 102. As used below, references to the vehicle door refer to the side sliding door 108, though it is to be appreciated that "the vehicle door" may refer to any and all vehicle doors under the control of the control system 102.

Figure 2:
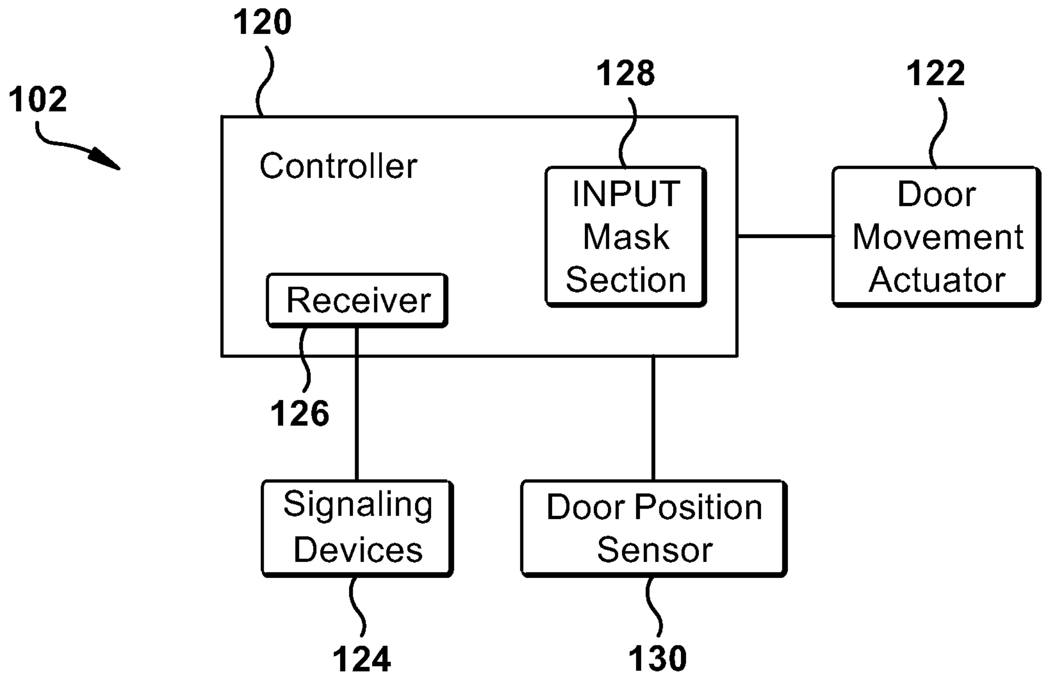
FIG. 2 is a block schematic illustration showing the automatic door movement control system.

As shown in FIG. 2, the control system 102 includes a controller 120 in communication with a door movement actuator 122 (hereinafter, "actuator 122"), a plurality of signaling devices 124, and a door position sensor 130. The controller 120 further includes a receiver 126 and an input mask module or section 128. Generally stated, a user instruction is input through one signaling device 124 and transmitted from the signaling device 124 to the controller 120, where the instruction is received by the receiver 126. The controller 120 then controls the actuator 122 to perform an automatic door movement operation in accordance with the instruction received from the signaling device 124. The input mask section 128 cooperates with the controller 120 to determine or ascertain a user intent when more than one instruction is near-simultaneously received, and selectively masks certain instructions to ensure the ascertained user intent is followed.

With more particular reference to the control system 102, the actuator 122 is configured to slide the side sliding door 108 in a rearward direction to open and in a forward direction to close, and may also be configured to automatically release and/or engage the latch mechanisms associated with the side sliding door 108. The actuator 122 may take the form of any automatic door movement control apparatus or accessory configured to perform an opening and closing operation with respect to the associated vehicle door, and may also include any device or accessory configured to release and/or engage a door latch mechanism. Such door movement control accessories are generally known in the art, and as such the actuator 122 will not be described in detail herein.

The plurality of signaling devices 124 are each configured to receive a user input and to relay the input via an instruction signal to the controller 120. Particularly, the signaling devices 124 are configured to receive a user input instruction to open and close a particular vehicle door, such as the side sliding door 108, and to relay the instruction signal to the controller 120. The plurality of signaling devices 124 may include: a driver open/close switch, an outer handle open/close switch 124A (FIGS. 1A and 1B), an inner handle open/close switch, a second row open/close switch, a third row open/close switch, and/or a remote open/close switch (other than the outer handle open/close switch 124A, the exemplary signaling devices 124 are not shown in the drawings). Any combination or subset of the above-listed signaling devices 124 may be used, and additional signaling devices which are not listed above may also be utilized. The above is intended as an exemplary, non-exhaustive, and non-limiting listing of signaling devices 124.

The signaling devices 124 may take the form of any device configured to perform the herein described functions, and may be situated or provided in any manner on or within the vehicle, as well as via a remote device, such as a key-fob. The signaling devices 124 may include any manner of actuation mechanism, such as buttons, switches, etc. Further, any signaling device 124 associated with a door handle (e.g., the outer handle open/close switch 124A and the inner handle open/close switch) may utilize the conventional motion/displacement of the handle (e.g., a displacement caused by pulling on a portion of the handle) as an actuation mechanism. Alternatively, the door handles, both inner and outer, may be provided with a button or switch mechanism disposed thereon so as to allow for manual (via the handle) and automatic (via the button/switch) opening and closing of the vehicle door.

The door position sensor 130 may take the form of any device configured to detect a position of the side sliding door 108 relative to the vehicle body 104 and the side opening 114, and to relay a signal indicative of the detected position to the controller 120. More particularly, the door position sensor 130 may be a pulse counter or any other manner of device configured to perform the necessary functions thereof. Door position sensors are generally known in the art, and as such a detailed description of the door position sensor 130 is not provided herein.

The controller 120 is in communication with the actuator 122 and the signaling devices 124 such that the controller 120 receives instruction signals from the signaling devices 124 and controls the actuator 122 to open and/or close the side sliding door 108 in accordance with a direction instruction associated with the instruction signal. The controller 120 includes the receiver 126 for receiving the instruction signals from the signaling devices 124, and the input mask section 128, the operation of which will be described in further detail below. The controller 120 may be a computer processing unit or any other processing unit configured to perform the herein described functions.

With respect to the receiver 126, any component configured to receive instruction signals from the signaling devices 124 may be used. The receiver 126 may be in wired (e.g., electrically connected) and/or in wireless or remote communication with the signaling devices 124. The particular manner in which any signaling device 124 is in communication with the receiver 126 and controller 120 is instructed by the particular embodiment of the signaling device 124. For example, a remote open/close switch, which may be provided on a key-fob, is likely to be in some manner of wireless communication with the receiver 126 and controller 120; the outer handle open/close switch 124A may be in wired communication with the receiver 126 and controller 120. It is to be appreciated that any manner of communication between electronic devices is amenable for use with the control system 102, and that the receiver 126 may take the form of any receiver configured to engage in the various manners of communication.

Inasmuch as providing a plurality of signaling devices 124 may improve convenience for users, conventional systems may be overloaded if more than one instruction signal is simultaneously or near-simultaneously received (an instruction signal conflict situation occurs). The overloaded system may then not operate in accordance with a user's intended instruction. Accordingly, the controller 120 is provided with the input mask section 128 which selectively masks received instruction signals, and is otherwise configured to ensure the actuator 122 performs according to the user's intent in performing an automatic open and/or close operation.

The input mask section 128 (e.g., the "mask") is configured to selectively prevent the controller 120 from controlling the actuator 122 based on certain instruction signals by masking or disregarding those instruction signals. Signal which are not masked are herein referred to as being "acknowledged". The input mask section 128 may be integrated in the controller 120 to perform the herein-described functions, and may alternatively be separate from the controller 120. In operation, the input mask section 128 may selectively prevent certain instruction signals from being received by the receiver 126, may prevent the receiver 126 from communicating certain instruction signals to operating sections of the controller 120, may prevent the controller 120 from outputting a control signal to the actuator 122 (e.g., prevent transmission of a door movement instruction signal), and/or may operate in conjunction with the controller 120 to ensure that certain instruction signals, though received, are not acknowledged or processed (e.g., disregarded) by the controller 120.

The above-mentioned instruction signal conflict situation arises when more than one instruction signal is received by the receiver 126 within a relevant time period. As used herein, the relevant time period may be a time required for a commenced automatic door movement operation based on a first instruction signal to complete, and is denoted as completion time TC. The completion time TC begins once a first or primary instruction signal is received by the receiver 126, and continues until the automatic door movement operation completes.

Once the completion time TC expires, the relevant vehicle door is in a full-open position or a full-closed position. Any subsequently received instruction signal will then be treated as a new primary instruction signal, and the control system 102 will commence automatic door movement operation based thereon. Furthermore, if the controller 120 stops the automatic door movement operation prior to completion (e.g., prior to the expiration of the completion time TC), the completion time TC is deemed to have expired at the moment of automatic door movement operation stoppage, and any subsequently received instruction signal will be treated as a new primary instruction signal.

The completion time TC may be fixed or predetermined for an automatic door movement operation which covers a complete range of motion of the side sliding door 108 (e.g., when moving from one of the full-open and full-closed positions to the other). Alternatively, the completion time may be variable if the side sliding door 108 had previously stopped at an intermediate position between the full-open and full-closed positions. In such a situation, the controller 120 calculates the completion time TC based on a door position signal received from the door position sensor 130. Particularly, the controller 120 may multiply a distance to be traveled by the side sliding door 108 (e.g., a distance between a current door position and a final door position) by a known or determinable rate of movement of the side sliding door 108 during automatic door movement control operation to determine or calculate the completion time TC.

An instruction signal received by the receiver 126 prior to the expiration of the completion time TC will be deemed a secondary or redundant instruction signal, and will be processed in accordance with the below-described method. Particularly, the redundant instruction signal is selectively masked by the input mask section 128 such that the controller 120 does not alter, stop, or reverse the commenced automatic door movement operation based thereon. However, under certain circumstances, the ascertained user intent dictates that the redundant instruction signal not be masked. Rather, the redundant instruction signal may be acknowledged and processed by the controller 120 such that the controller 120 controls the actuator 122 to either stop or reverse the automatic door movement operation underway based on the primary instruction signal.

The input mask section 128 is provided to selectively mask redundant instruction signals so the controller 120 may operate the door movement actuator 122 according to the ascertained user intent. The ascertained user intent is determined in accordance with a below described method which is executed by one or both of the controller 120 and the input mask section 128. Upon ascertaining the user intent, a determination is made as to whether the redundant instruction signal should or should not be masked in order for the controller 120 to control the actuator 122 in accordance with the ascertained user intent.

Prior to particularly describing the method for determining user intent, it is noted that a first instruction signal received by the receiver 126 while the side sliding door 108 is stopped (e.g., is not being automatically moved by the actuator 122) is termed a "primary instruction signal". For an instruction signal to be a primary instruction signal, the side sliding door 108 should not be in the process of being opened or closed by the actuator 122 (e.g., a previous automatic door movement operation has completed or been otherwise stopped). Accordingly, when the side sliding door 108 is fully opened, fully closed, or stopped at any position therebetween, the first instruction signal received is the primary instruction signal. The primary instruction signal may always be acknowledged and processed by the controller 120 such that the controller 120 controls the actuator 122 to commence the automatic door movement operation based on the direction instruction associated with the primary instruction signal.

Any subsequent instruction signal received at the receiver 126 following the primary instruction signal and prior to completion of the open/close operation (e.g., prior to the expiration of the completion time TC) or stop of the side sliding door 108 between the fully opened and fully closed positions is termed a "redundant instruction signal". In particular occasions, the redundant instruction signal may be an intentionally relayed instruction signal intended to stop or reverse operation of the side sliding door 108, and as such should be acknowledged and followed by the controller 120. In other occasions, the redundant instruction signal may be an unintentionally relayed signal, or may be an intentionally relayed instruction signal where operation in accordance therewith would be opposed to the user's intended instruction, and as such should be masked. It is noted that more than one redundant instruction signal may be received within the relevant time period, and that each redundant instruction signal is processed in the same manner.

As used herein, the term "mask" references any manner in which a redundant instruction signal is blocked, ignored, or otherwise disregarded. Generally stated, the redundant instruction signal is masked when the primary instruction signal is determined to be indicative of user intent. Conversely, the redundant instruction signal is not masked when determined to be indicative of user intent. More particularly, if certain conditions are met, the control system 102 determines that the user intent corresponds to the instruction associated with the primary instruction signal, and therefore also determines that a mask should be applied to the received redundant instruction signal(s) such that the controller 120 does not respond or alter the control of the actuator 122 in response thereto. A determination that a redundant instruction signal should be masked is made in consideration of one or more factors deemed to be indicative of user desire.

Exemplary factors for consideration and determination of user intent may include a time lapse between receipt of the primary instruction signal and the redundant instruction signal, the originating signaling device 124 associated with the primary instruction signal and the redundant instruction signal, the direction instruction associated with the primary instruction signal and the redundant instruction signal, and the proximity of the side sliding door 108 to completing a commenced automatic door movement operation. It is to be appreciated that all or some subset of the above-listed factors may be considered in ascertaining the user's intent. It is also to be appreciated that other factors may be considered in combination with some or all of the above-listed factors, and that certain signaling devices 124 may be prioritized over others (e.g., the driver open/close switch 124A may be set to have priority over the inner handle open/close switch 124C). It is noted that as additional factors are added for consideration, the likelihood of accurately ascertaining the user's intent may increase. However, as will be clear with reference to the below-described method, consideration of too many factors may result in too few redundant instruction signals being masked. As such, only those factors found most relevant are considered in the below-described method to ensure that an efficient and effective number of factors are considered.

Figure 3:
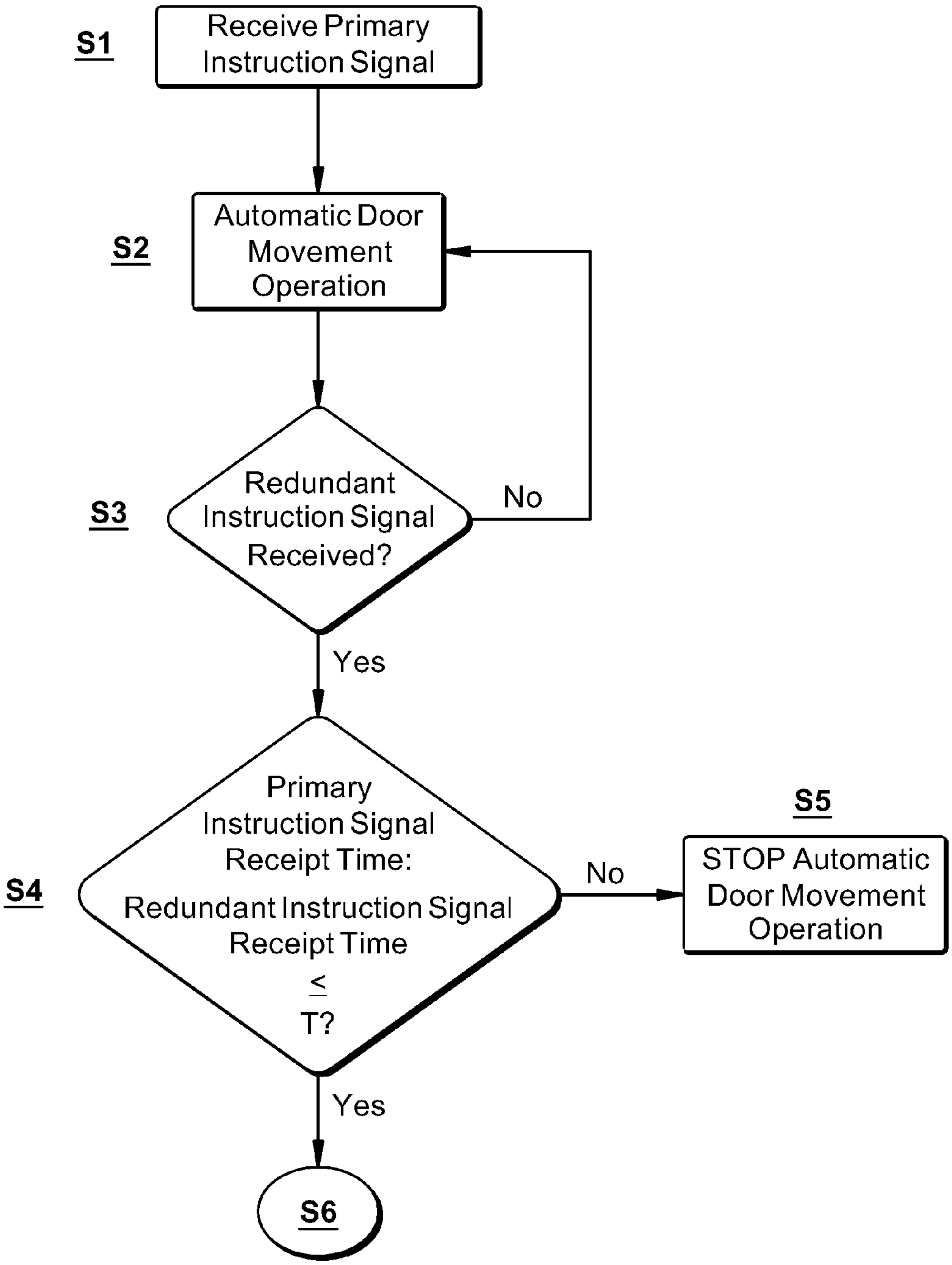
FIG. 3A and FIG. 3B are a flow-chart illustrating an operational process executed by the automatic door movement control system.
Figure 3A:
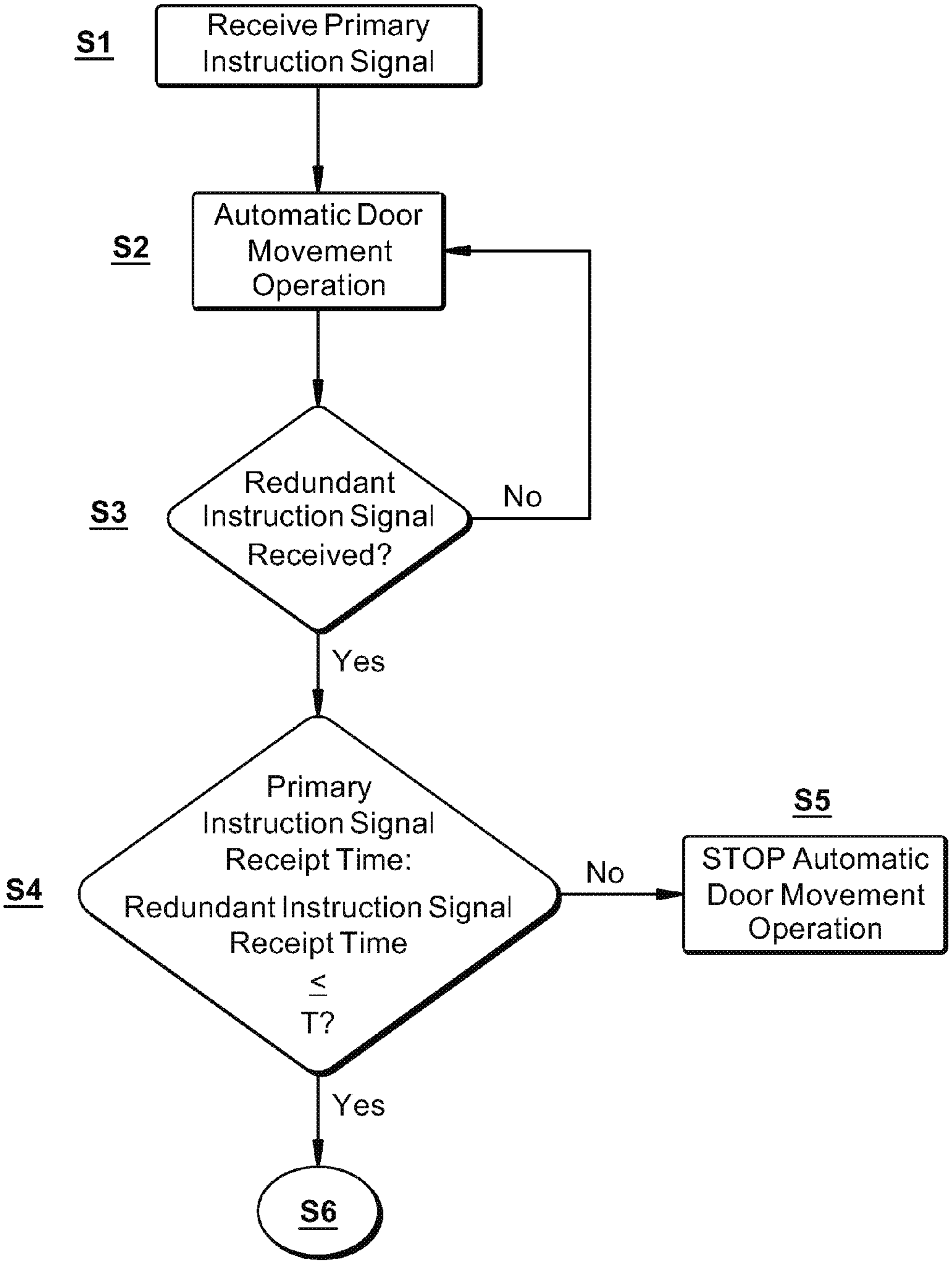
Figure 3B:
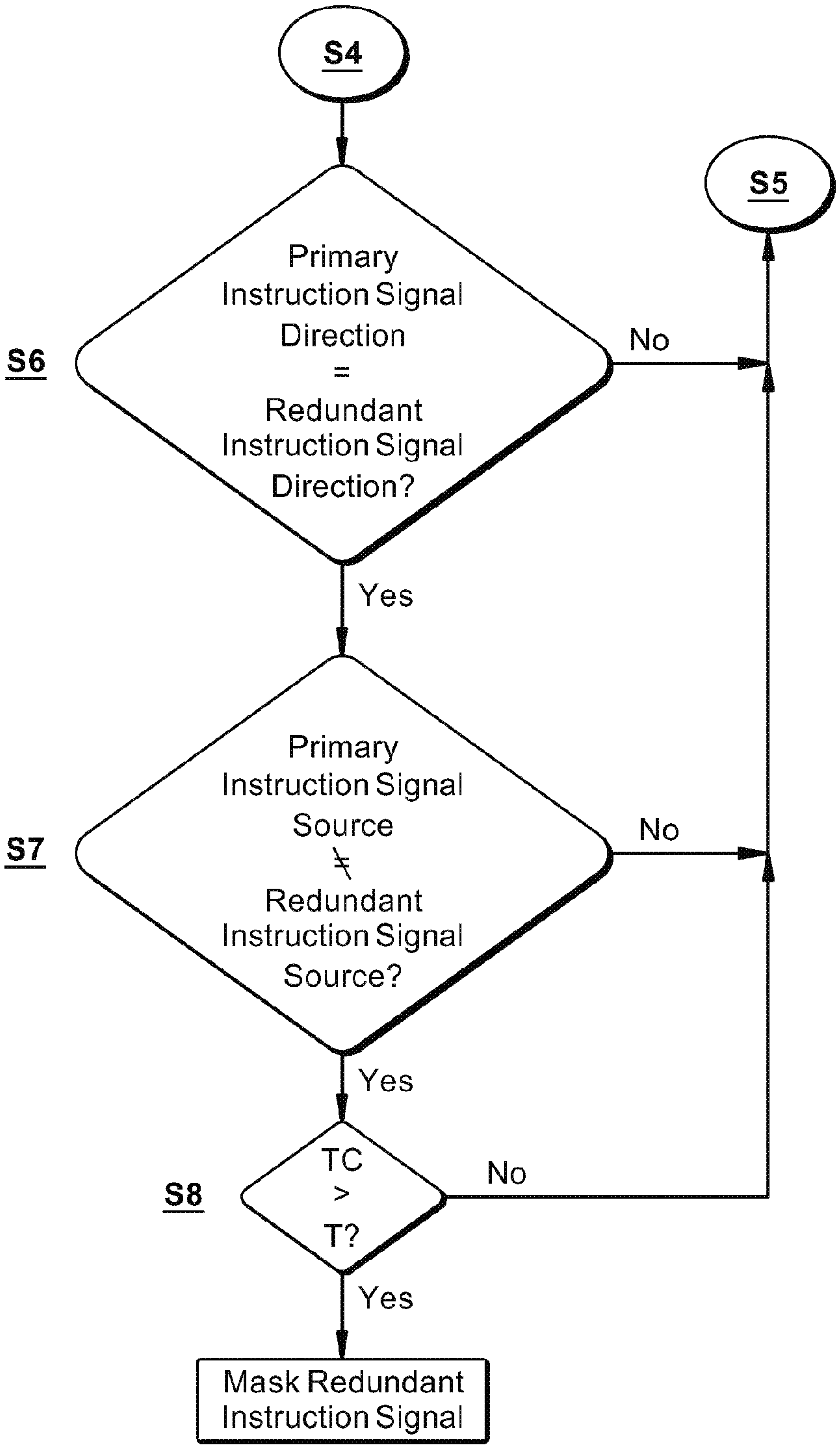

FIGS. 3A and 3B provide a flow-chart illustrating the operation of the control system 102 incorporating the controller 120 with the input mask section 128. The method illustrated in FIGS. 3A and 3B considers the time lapse between receipt of the primary instruction signal and the redundant instruction signal, the direction instruction associated with the primary instruction signal and the redundant instruction signal, the originating signaling device 124 associated with the primary instruction signal and the redundant instruction signal, and the relative proximity of the side sliding door 108 to completing the automatic door movement operation.

The method begins with the input of an instruction by the user at any of the signaling devices 124. For the purposes of this explanation, the side sliding door 108 is presumed to be stopped in any of the full-open position, the full-closed position, or an intermediate position. The instruction signal is then output from the signaling device 124 and received by the receiver 126 as the primary instruction signal (S1). The controller 120 receives the primary instruction signal from the receiver 126, processes the primary instruction signal, and controls the actuator 122 to begin automatic door movement operation in accordance with the direction instruction associated with the primary signal (S2). Particularly, if an opening instruction is received, the controller 120 controls the actuator 122 to perform an opening operation; if a closing instruction is received, the controller 120 controls the actuator 122 to perform a closing operation.

The completion time TC is determined or calculated at this point, and begins counting down upon receipt of the primary instruction signal. As mentioned above, if the automatic door movement operation begins at a full-open or full-closed position, the completion time TC may be set to begin at a predetermined or known time. Otherwise, the controller 120 may need to calculate the completion time TC. It is further noted that upon receipt of the primary instruction signal and commencement of the automatic door movement operation, the completion time TC begins counting down. Accordingly, the completion time TC varies with time following receipt of the primary instruction signal (alternatively, the completion time may begin counting down upon commencement of the automatic door movement operation). Furthermore, it is noted that the controller 120 may be set to always determine or calculate the completion time TC as opposed to relying on preset completion time TC values. Such a configuration may provide for more a more accurate value of the completion time TC.

If, during the automatic door movement operation (e.g., prior to the expiration of the completion time TC), a redundant instruction signal is not received (S3, NO), the automatic door movement operation continues to completion (S2). Upon completion, any subsequently received instruction signal (e.g, an instruction signal received following the expiration of the completion time TC) will be a primary instruction signal, and is processed accordingly. However, if a redundant instruction signal is received during the automatic door movement operation (S3, YES), the method continues to determine whether the redundant instruction signal should be masked (e.g., disregarded) or acknowledged and processed such that the actuator 122 is controlled based thereon.

To determine whether the redundant instruction signal should be masked or acknowledged, a series of factors separately and/or cumulatively indicative of user intent are considered. Each factor is considered and processed such that the control system 102 may make as accurate a determination of user intent as is possible. With respect to the flow-chart of FIGS. 3A and 3B, one factor to be considered relates to a time lapse between the receipt of the primary instruction signal and receipt of the redundant instruction signal by the receiver 126 in the controller 120 (S4).

Particularly, a receipt time of the primary instruction signal is compared to a receipt time of the redundant instruction signal (S4). If the redundant instruction signal receipt time is greater than a predetermined mask time T following the primary instruction signal receipt time (S4, NO), the controller 120 controls the actuator 122 to stop the door movement operation presently (S5). In other words, the controller 120 acknowledges and processes the redundant instruction signal, and operates based on the redundant instruction signal (which is not masked). Alternatively, if the redundant instruction signal receipt time is less than the predetermined mask time T from the primary instruction signal receipt time (S4, YES), then the possibility that the redundant instruction signal is not indicative of the user's intent remains sufficient to warrant further consideration as to whether the redundant instruction signal should be masked.

The duration of time between receipt of the primary instruction signal and the redundant instruction signal is believed to be indicative of the user's intent. Particularly, the greater the time between receipt of the primary and redundant instruction signals, the more likely the redundant instruction signal is an intentionally relayed instruction that should be acknowledged and processed. Conversely, if the time lapse between receipt of the primary instruction signal and the redundant instruction signal is relatively short, the likelihood that the user's intent is reflected by the primary instruction signal increases. In this regard, a sample mask time may be set in a range greater than 0 seconds and less than 3.0 seconds, and more particularly may be set to approximately 1.2 seconds.

For example, if, following receipt of an instruction signal and prior to completion of the automatic door movement operation, a change of user intent occurs, a subsequently input instruction (which is relayed as the redundant instruction signal) is indicative of the user intent (e.g., that the automatic door movement operation should stop or reverse). In this situation, the redundant instruction signal should not be masked; rather, the redundant instruction signal should be acknowledged and processed such that the controller 120 controls the actuator 122 to stop or reverse the commenced automatic door movement operation. In this situation, the receipt time of the redundant instruction signal is likely to lag behind that of the primary instruction signal by at least the mask time T, which may be set on the order of milliseconds.

In a contrary situation, if more than one signaling device 124 is being near-simultaneously actuated, such as when a driver is actuating a driver open/close switch while a passenger is actuating another of the signaling devices 124 (such as, for example, if the driver is attempting to open the side sliding door 108 for passengers who are near-simultaneously actuating the inner door handle open/close switch in an impatient attempt to accelerate their egress), the user's intent is best ascertained by the primary instruction signal. In this situation, the receipt time of the primary and redundant instruction signals is likely to be minimal and less than the mask time T.

Assuming both parties are inputting a common directional instruction, it is irrelevant which instruction signal is processed as the primary and which as the redundant. It is noted that even if the redundant instruction signal contains a common direction instruction with the primary instruction signal, the redundant instruction signal processing may result in the controller 120 stopping the commenced automatic door movement operation. In other words, processing of the redundant instruction signal may lead the controller 120 to stop a commenced automatic door movement operation. Accordingly, in this situation, the redundant instruction signal should be masked, and the commenced automatic door movement operation should continue.

Though the two above-described situations are merely exemplary, it can be ascertained therefrom that a time lapse between receipt of the primary instruction signal and the redundant instruction signal may generally be minimal in a situation where the primary instruction signal is indicative of user intent and should control (e.g., two simultaneously actuated signaling devices 124). Conversely, the time lapse between receipt of the primary instruction signal and the redundant instruction signal will be relatively greater when resulting from a change of user intention. Accordingly, the mask time T is set to demarcate a near-simultaneous actuation of signaling devices 124, where the user's intent corresponds to that relayed via the primary instruction signal (e.g., S4, YES), from a change of intention leading to an actuation of a signaling device 124 to halt or reverse a commenced automatic door movement operation (e.g., S4 NO).

The mask time T may be experimentally determined to set the temporal demarcation between the scenarios (or based on other considerations). Alternatively, the mask time T may be calculated based on various factors relating to human reaction time, or may be arbitrarily set. It is noted that the mask time T may begin counting down upon receipt of the primary instruction signal and commencement of the automatic door movement operation based thereon. Once the mask time T expires, a received redundant instruction signal will be acknowledged and processed, even if received prior to completion of the automatic door movement operation (e.g., prior to expiration of the completion time TC). If the redundant instruction signal is received prior to expiration of the mask time T, the input mask section 128 and the controller 120 may mask the redundant instruction signal such that the commenced automatic door movement operation continues.

Another factor to be considered in ascertaining user intent is the direction instruction associated with the primary and redundant instruction signals. As used herein, the "direction instruction" references whether the instruction signal is an opening instruction (e.g., an "opening direction") or a closing instruction (e.g., a "closing direction"). Particularly, the direction instruction from the redundant instruction signal is compared to the direction instruction from the primary instruction signal (S6). If the direction instruction associated with the redundant instruction signal is opposite from that associated with the primary instruction signal (S6, NO), the redundant instruction signal is acknowledged and processed (e.g., not masked), and the controller 120 controls the actuator 122 to either stop or reverse the automatic door movement operation underway based on the primary instruction signal (S5). If the direction instruction associated with the redundant instruction signal is the same as that associated with the primary instruction signal (S6, YES), the redundant instruction signal may warrant masking based on consideration of additional factors.

The former situation (that of S6, NO) may arise when the primary instruction signal is input and sent in error. The primary instruction signal should then be overridden by an opposite direction redundant instruction signal input to counteract the erroneously generated primary instruction signal so the control system 102 may operate in accordance with the user's intended instruction. As such, the redundant instruction signal is acknowledged and processed (e.g., not masked) such that the controller 120 controls the actuator 122 to either stop or reverse the door movement operation underway based on the primary instruction signal.

The later situation (that of S6, YES) may arise when one user actuates one signaling device 124 while another user near-simultaneously actuates another signaling device 124 (as described in the example above). In such a situation, both users are attempting to relay the same instruction. Accordingly, controlling the actuator 122 to stop or reverse the door movement operation may be contrary to user intent. As such, the redundant instruction signal may be masked to ensure the user's intended instruction is followed.

Another factor to be considered in determining whether to mask or process the redundant instruction signal relates to the source or originating signaling device 124 of the primary instruction signal and the redundant instruction signal (S7). If the primary instruction signal and redundant instruction signal originate from a common signaling device 124 (S7, NO), it is determined that the redundant instruction signal should not be masked. As such, the controller 120 acknowledges and processes the redundant instruction signal and controls the actuator 122 to stop the commenced automatic door movement operation based on the primary instruction signal (S5). If the primary and redundant instruction signals originate from different signaling devices 124 (S7, YES), the redundant instruction signal may warrant masking in order to control the actuator 122 in accordance with the user's intended instruction.

The former situation (that of S7, NO) may arise when a user inadvertently or mistakenly actuates one of the signaling devices 124. To remedy the inadvertent actuation (and recall the primary instruction signal), the user may actuate the same signaling device 124 in the same manner (e.g., press a common button twice) with an intention of stopping the automatic door movement operation. The second input instruction, which is output and/or received as a redundant instruction signal, is indicative of the user's intent, and should be acknowledged and processed (e.g., not masked) such that the controller 120 controls the actuator 122 to stop the commenced automatic door movement operation. As such, when the primary and redundant instruction signals originate from a common signaling device 124, the redundant instruction signal is deemed more likely to be indicative of the user's intent, and is therefore not masked.

The later situation (that of S7, YES) may arise, as described above, when one user actuates a signaling device while another user near-simultaneously actuates a different signaling device 124. In this situation, it can be assumed that the user intent is for the side sliding door 108 to move in the instructed direction associated with the primary instruction signal (which is also the direction instruction input at the signaling devices 124 that outputs the redundant instruction signal). Accordingly, the primary instruction signal is deemed more likely to be indicative of the user's intent, and the redundant instruction signal may be masked to ensure the user's ascertained intent is followed.

It is noted that if, in the above-situation, the direction instruction associated with either the passenger's or driver's input is different from that of the other, the door movement operation will be stopped or reversed in accordance with S6. Furthermore, when the primary and redundant instruction signals have a common direction instruction associated therewith, the controller 120 may not control the actuator 122 to reverse the door movement operation, which would be contrary to the direction instruction associated with both the primary and redundant instruction signals. Rather, the controller 120 may only control the actuator 122 to stop the commenced automatic door movement operation.

In summary, if the redundant instruction signal is received within the mask time T from receipt of the primary instruction signal, and has a common direction instruction with, and different originating signaling device 124 from, the primary instruction signal, the process continues to consider additional factors to determine whether the redundant instruction signal should be masked. Assuming all of the above considerations have yet to lead to a conclusion that the redundant instruction signal is to be acknowledged and processed, a consideration of the position of the side sliding door 108 along the guide channel 116, and relative to the vehicle body 104 and side opening 114, is made.

Particularly, a determination is made as to whether the automatic door movement operation can complete before the expiration of the mask time (S8). In other words, a determination is made as to whether the mask time T is greater than the completion time TC (e.g., T> or <TC?) at the time of receipt of the redundant signal. This consideration is especially relevant in situations where the side sliding door 108 has stopped in an intermediate position between the full-open and full-closed positions.

If the automatic door movement operation can complete before expiration of the mask time (S8, NO), the controller 120 controls the actuator 122 to stop the door movement operation underway based on the primary instruction signal (S5). In other words, if the completion time TC is less than the mask time T, the redundant instruction signal is not masked. This consideration is provided to ensure the safe operation of the side sliding door 108. Specifically, allowing the side sliding door 108 to reach a fully closed or opened position without an ability to immediately stop the automatic door movement operation may present a pinching hazard. Accordingly, especially when the vehicle door has nearly completed an opening and/or closing operation, it is desirable that the automatic door movement operation be quickly stoppable. It is noted that other safety features may be provided to ensure the stopping of the side sliding door 108, such as pinch detection sensors, etc.

In the alternative, if the automatic door movement operation cannot complete prior to the expiration of the mask time (S8, YES), and the all of the above-discussed considerations also support such a conclusion (e.g., S4, S6, and S7 are YES), then the redundant instruction signal is masked (S9). As such, the redundant instruction signal is disregarded by the controller 120 and the automatic door movement operation underway based on the primary instruction signal is continued.

With respect to the above discussed considerations, it is reiterated that certain considerations may be omitted or otherwise altered while remaining within the scope of the present disclosure. For example, the above method is amenable to a single inquiry, such as that described by S4 (comparison of receipt times of primary and redundant instruction signals). Further, the consideration of S8 may be omitted if adequate safety features are available (e.g., if a pinch-detection mechanism is provided to automatically stop a door movement if a pinch is detected). Further still, if certain signaling devices 124 are prioritized over others, an additional inquiry regarding preset prioritization may be added.

Figure 4A:
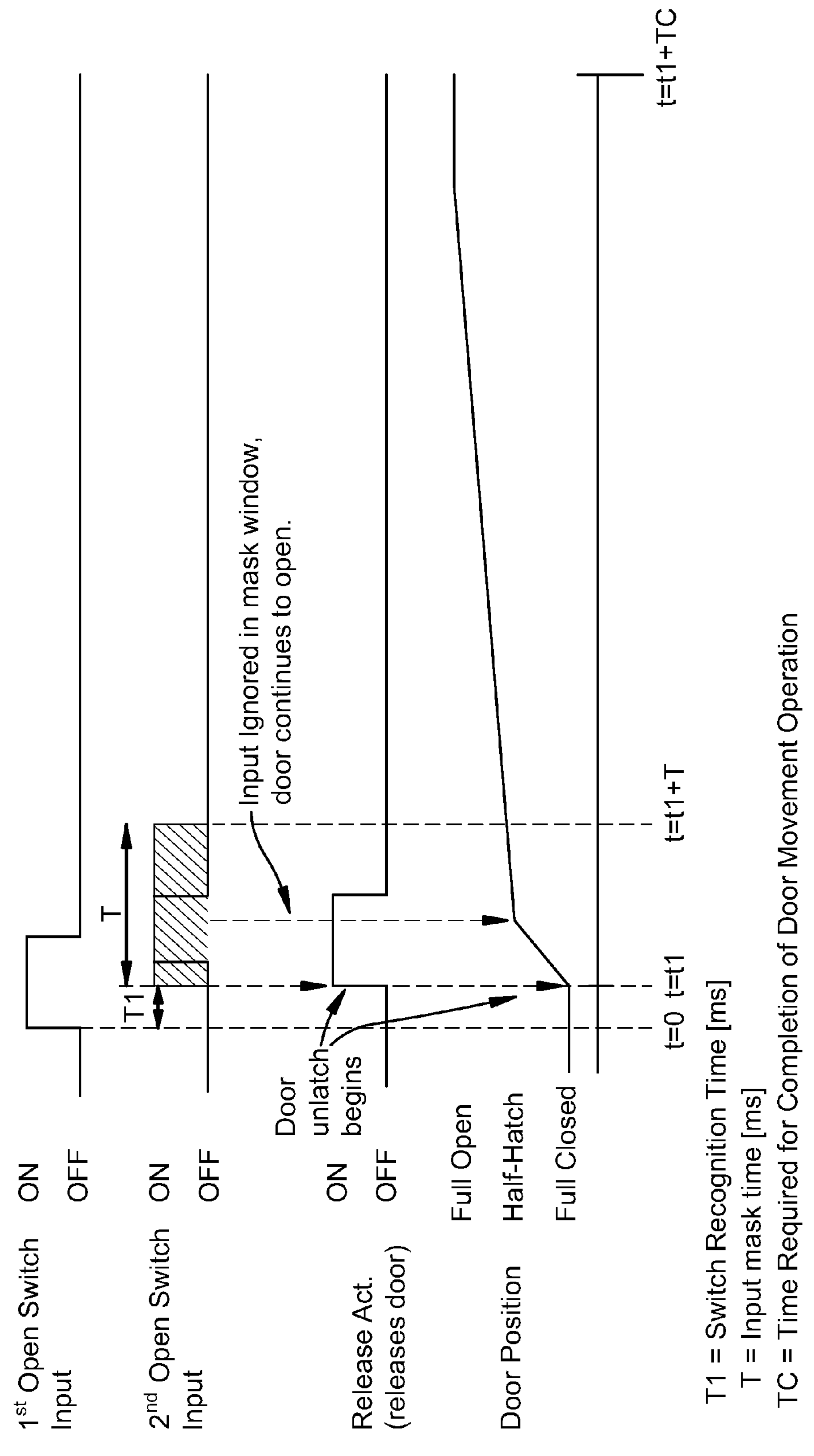
FIG. 4A illustrates a series of corresponding time-lapse graphs illustrating the operation of the automatic door movement control system when operating to open an associated vehicle door.
Figure 4B:
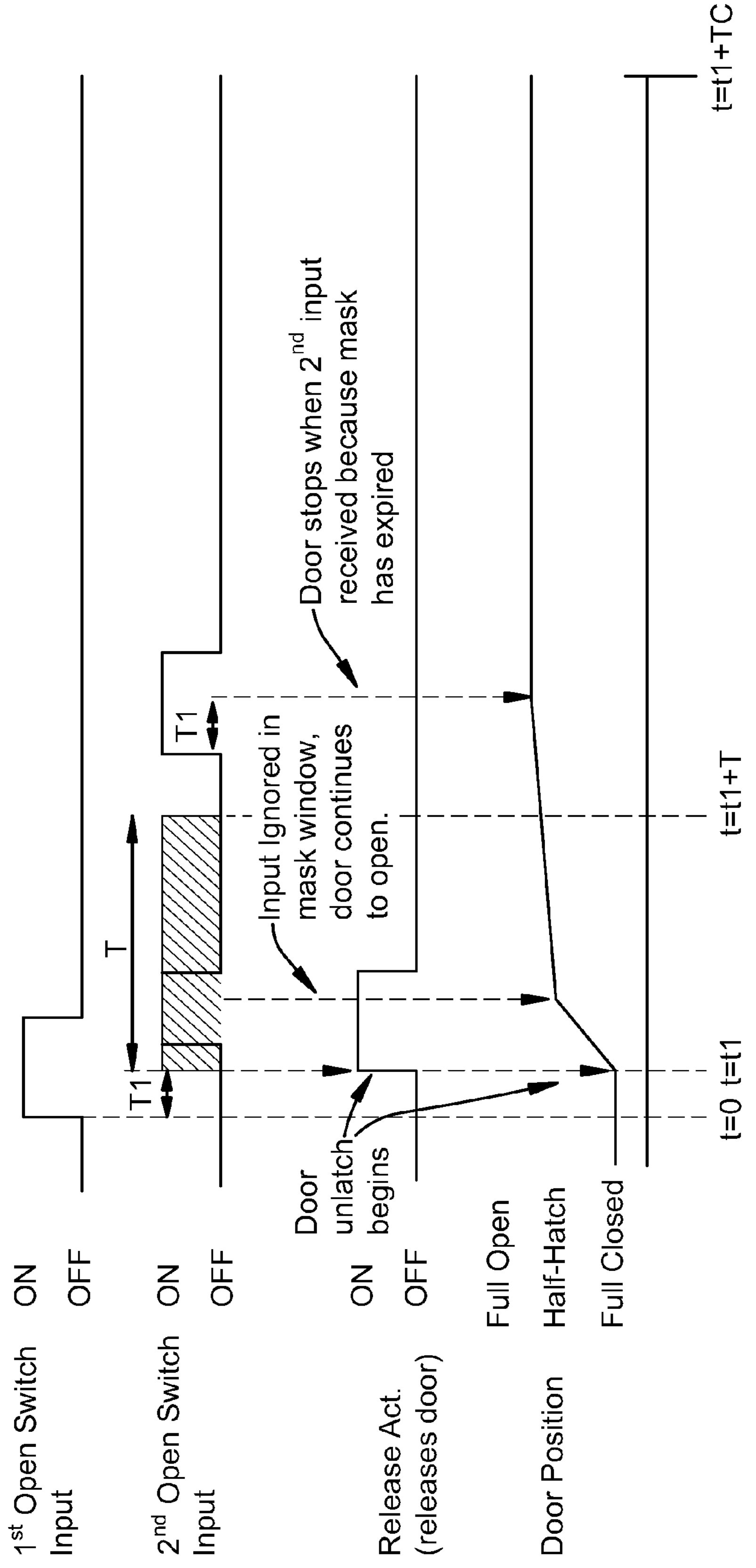
FIG. 4B illustrates a series of corresponding time-lapse graphs illustrating the operation of the automatic door movement control system when operating to close the associated vehicle door.

FIGS. 4A and 4B graphically illustrate the time-sequenced operation of the control system 102. Beginning with FIG. 4A, an operation of the control system 102 in controlling the automatic door movement operation from a fully closed position to a fully open position (e.g., an opening direction) is shown. Initially, the user actuates one of the signaling devices 124 by inputting an open instruction at a time t=0. The actuated signaling device 124 then generates and outputs the primary instruction signal, which is received by the receiver 126 in the controller 120 at a receipt time t1. The receipt time t1 is a switch recognition time, which is a time lapse between the actuation of a signaling device 124 and the receipt of the signal output therefrom.

At time t=t1, when the primary instruction signal containing the open instruction is received by the controller 120, the controller 120 controls the actuator 122 to begin the automatic door movement operation in the opening direction. Additionally, the mask time T and the completion time TC may begin counting down at time t=t1 when the primary instruction signal is received by the controller 120. It is noted that the actuator 122 begins the automatic door movement operation substantially simultaneously with the receipt of the instruction signal by the receiver 126 and the controller 120. If there is a lag time between receipt of the instruction signal and commencement of the automatic door movement operation, this may need to be factored into the above-described method.

During the mask time period (t1 to t1+T), any received redundant instruction signals may be masked in accordance with the process described above. Specifically, if a second input is made at a signaling device 124 at a time between t=t1 and t=t1+T, the redundant instruction signal received at the controller 120 is masked so long as other factors, if considered, are also satisfied. If the redundant instruction signal is received after the mask time (e.g., after t=t1+T), the redundant instruction signal is acknowledged and processed such that the controller 120 controls the actuator 122 to stop (as illustrated) or reverse the automatic door movement operation.

As shown in FIG. 4A, a second open/close switch input made at a signaling device 124 during the mask time T is masked, and the automatic door movement operation is allowed to continue. As shown in FIG. 4B, a second open/close switch input made at a signaling device following the expiration of the mask time T is not masked, and results in the controller 120 controlling the actuator 122 to stop the automatic door movement operation. It is again noted that an instruction signal received following the expiration of the completion time TC is deemed a primary instruction signal (assuming the received instruction signal is the first received instruction signal following stopping of the automatic door movement operation) and processed accordingly.

With respect to the above, the disclosed control system 102 and the method for operation thereof are amenable for use with the other vehicle doors. Particularly, the control system 102 is similarly operable to control an actuator associated with the automatic opening and closing of any other door, including the front swinging doors 106, a second side sliding door, and the rear tailgate 110. The controller 120 may not need to be substantially changed to allow for control of the other vehicle door actuators, and is amenable to control all of the vehicle doors 106, 108, 110. Furthermore, the components of the control system 102 associated with the vehicle door (e.g., actuator 122) may need to be provided for each door. For example, more than one door movement actuator 122 and door position sensor 130 may be provided, though there need not necessarily be a one-to-one correlation between controlled vehicle doors and actuators 122 and position sensors 130. Further still, if more than one vehicle door movement is controlled by the control system 102, the control system 102 may still allow for simultaneous or near-simultaneous control of each of the vehicle doors according to the above described method.

Additionally, though the process or method of operation of the control system 102 is described above, and illustrated, as being performed with a particular sequence, it is to be appreciated that the method may be performed in any order, and may add or delete certain portions thereof. For instance, any of the above-discussed considerations, which are presented as S4 and S6-S8, may be deleted (e.g., not considered). Alternatively, additional considerations may be inserted or substituted as deemed appropriate. The above-described considerations are made in an attempt to ascertain the intent and desire of the user(s). As such, the considerations are to be taken as non-limiting features which may be altered, deleted, and/or added to so as to ascertain the intent and desire of the user.

Furthermore, as discussed above, a time lag t1 presents between input of an instruction at a signaling device 124 and receipt of the instruction signal by the receiver 126 and the controller 120. This time lag t1 may be fixed for all of the different signaling devices, and therefore may not need to be accounted for during processing by the controller 120. In this regard, it is noted that the above method is described with respect to "receipt" of the instruction signals, as opposed to an input of the same signals. However, if desired, the time lag t1 associated with each signaling device 124, with different time lag t1 values if the time lag varies amongst the signaling devices 124, may be entered into the above computation such that the process proceeds based on input times as opposed to receipt times. Moreover, there may be some delay between receipt of an instruction signal (e.g., a primary instruction signal) and commencement of the automatic door movement operation. This delay may be accounted for in setting one or both of the mask time T and the completion time TC.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A control system for controlling an automatic vehicle door movement control system comprising:

a plurality of signaling devices each adapted to generate an instruction signal instructing at least one of opening and closing of at least one vehicle door;

a controller for receiving the instruction signal generated by the plurality of signaling devices; and at least one door actuator for opening and closing at least one vehicle door in accordance with the instruction signal from the signaling devices, the controller being configured to mask the redundant instruction signal upon a determination that the primary instruction signal is indicative of user intent, and the controller being configured to selectively mask a redundant instruction signal received within a predetermined mask time following receipt of a primary instruction signal.

2. The control system according to claim 1, wherein the controller is configured to acknowledge the redundant instruction signal when a direction instruction associated with the primary instruction signal differs from a direction instruction associated with the redundant instruction signal.

3. The control system according to claim 1, wherein the controller is configured to acknowledge the redundant instruction signal when the primary instruction signal and the redundant instruction signal originate from a common signaling device.

4. The control system according to claim 1, wherein the controller is configured to acknowledge the redundant instruction signal when a time required for the automatic door movement operation to complete is less than the predetermined mask time.

5. The control system according to claim 1, wherein the controller is configured to stop an automatic door movement operation when the redundant instruction signal is acknowledged.

6. The control system according to claim 1, wherein the plurality of signaling devices are configured to generate the primary instruction signal and the redundant instruction signal, the controller is configured to control the at least one door actuator based on at least the primary instruction signal, and the redundant instruction signal is generated after the primary instruction signal and prior to completion of automatic door movement in accordance with the primary instruction signal.

7. A control system for controlling an automatic vehicle door movement control system comprising:

a plurality of signaling devices each adapted to generate an instruction signal;

a controller for receiving the instruction signal generated by the plurality of signaling devices; and at least one door actuator for opening and closing at least one vehicle door in accordance with the instruction signal from the signaling devices, the controller being configured to selectively mask a redundant instruction signal received within a predetermined mask time of a primary instruction signal, wherein the controller is configured to mask the redundant instruction signal when a direction instruction associated with the primary instruction signal is the same as a direction instruction associated with the redundant instruction signal, the primary instruction signal and redundant instruction signal originate from different signaling devices, and a time required for completion of the automatic door movement operation is greater than the predetermined mask time.

8. An automatic vehicle door movement control system for automatically controlling movement of a vehicle door and comprising a controller and a plurality of signaling devices configured to output a door movement instruction signal instructing at least one of opening and closing of the vehicle door, the controller further comprising:

a receiver configured to receive door movement instruction signals from each of the plurality of signaling devices; and an input mask section configured to selectively mask a redundant instruction signal received after a primary instruction signal and prior to completion of an automatic door movement operation, and the control system further comprising a door actuator associated with the vehicle door and in communication with the controller, wherein the controller controls the door actuator to move the vehicle door in accordance with the door movement instruction signal received from the signaling devices.

9. The system according to claim 8, wherein the input mask section is configured to mask the redundant instruction signal when the redundant instruction signal is received within a predetermined mask time from receipt of the primary instruction signal.

10. The system according to claim 8, wherein the input mask is configured to mask the redundant instruction signal when a direction instruction associated with a primary instruction signal is the same as a direction instruction associated with the redundant instruction signal, the primary instruction signal and redundant instruction signal originate from different signaling devices, a time lapse between receipt of the primary instruction signal and receipt of the redundant instruction signal is less than a predetermined mask time, and a time required for completion of the automatic door movement operation is greater than the mask time.

11. The system according to claim 8, wherein the plurality of signaling devices include at least one of: a driver open/close switch, a door outer handle open/close switch, an door inner handle open/close switch, a second row open/close switch, a third row open/close switch, and a remote open/close switch.

12. The system according to claim 8, wherein the door actuator associated with the vehicle door includes at least one of: a single sliding door actuator associated with a side sliding door, a multiple sliding door actuator associated with more than one side sliding door, a tailgate actuator associated with a rear tailgate, a swinging door actuator associated with a swinging side door, and a multiple swinging door actuator associated with more than one swinging side door.

13. An automatic vehicle door movement control system for automatically controlling movement of a vehicle door and comprising a controller and a plurality of signaling devices configured to output a door movement instruction signal, the controller further comprising:

a receiver configured to receive door movement instruction signals from each of the plurality of signaling devices; and an input mask section configured to selectively mask a redundant instruction signal received after a primary instruction signal and prior to completion of an automatic door movement operation, wherein the controller is configured to acknowledge a redundant instruction signal and to stop automatic door movement operation upon receipt of a redundant instruction signal by the receiver when the redundant instruction signal satisfies any one of the following conditions:

a direction of a door movement instruction signal associated with the redundant instruction signal is different from a direction of a door movement instruction signal associated with a primary instruction signal;

the redundant instruction signal and the primary instruction signal originate from a common signaling device;

a time lapse between receipt of the primary instruction signal and the redundant instruction signal is greater than a predetermined time; and a mask time is less than a time required for the automatic door movement operation to complete.

* * * * *